Figure 1:
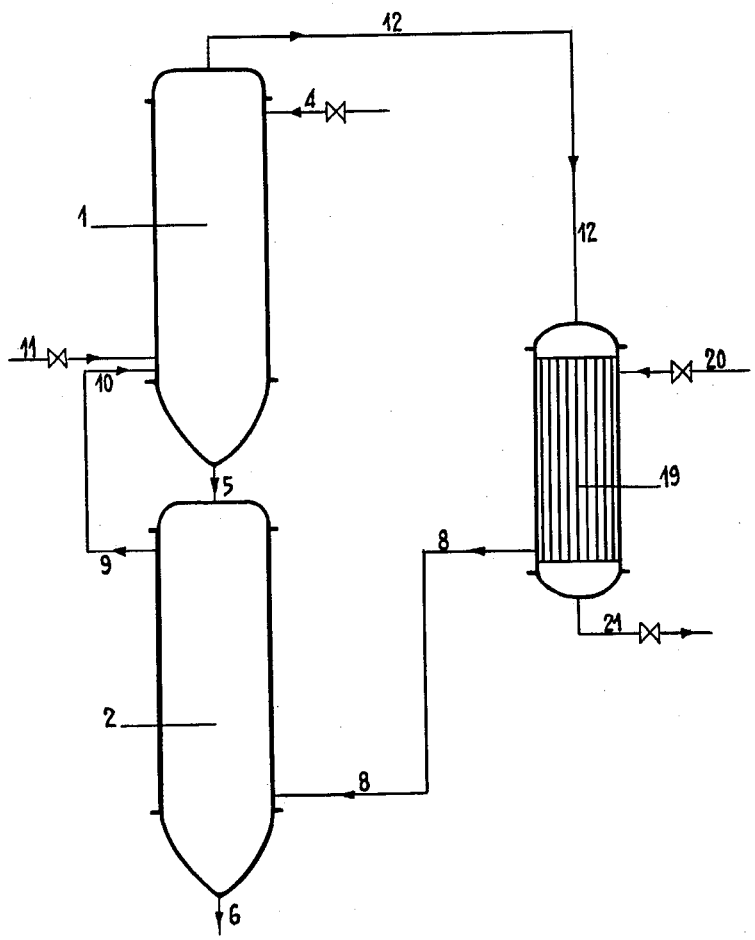

March 3, 1964  L. RUELLE ET AL  3,123,567

PREPARATION OF CARBON AND METAL OXIDE MATERIALS

Filed Jan. 23, 1961  2 Sheets-Sheet 1

— Fig. 1 —

INVENTORS
Louis Ruelle
Maurice Noble
BY Ooms, McDougall,
Williams & Hersh
Att'ys

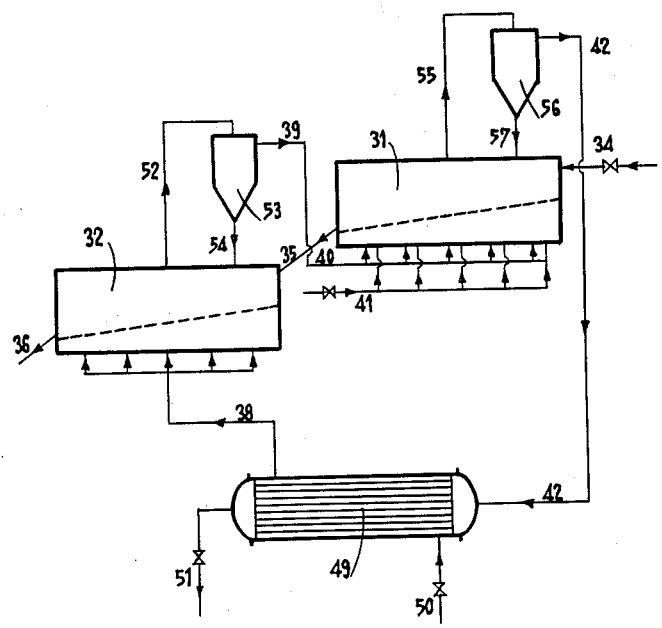
_Fig. 2_
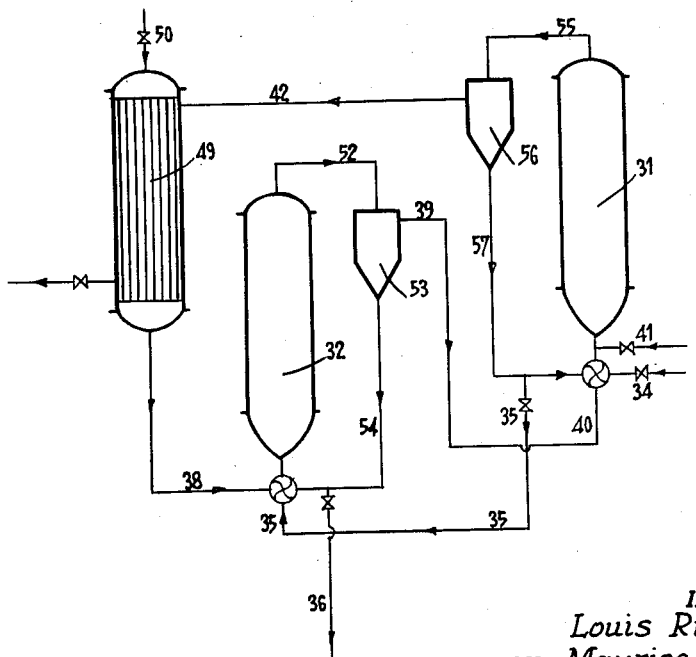
_Fig. 3_
INVENTORS
Louis Ruelle
Maurice Noble
BY
Opms, McDougall,
Williams Y Hersh
att'ys United States Patent Office 3,123,567
Patented Mar. 3, 1964

3,123,567
PREPARATION OF CARBON AND METAL
OXIDE MATERIALS
Louis Ruelle and Maurice Noble, Grenoble, Isere, France, assignors to Pechiney, Compagnie de Produits Chimiques et Electrometallurgiques, Paris, France
Filed Jan. 23, 1961, Ser. No. 84,098
Claims priority, application France Jan. 22, 1960
8 Claims. (Cl. 252—188)

The present invention relates to a process for the manufacture of materials substantially consisting of a metal oxide with a high melting point in combination with reducing carbon. The invention relates more particularly to the production of carbon-carrying ingredients which may be utilized as charges in redox processings, particularly carbothermal reductions of metallic oxides and like processes.

In the carbothermal reduction of metallic oxides, it is advantageous to have the oxide particles impregnated with carbon whereby the reduction of the oxides may be effected in a highly efficient manner. In order to achieve maximum efficiency, it is necessary to provide the oxide particles with the intimately associated carbon in a manner which is itself relatively inexpensive and efficient.

It is therefore an object of this invention to provide a process for the manufacture of materials substantially consisting of metal oxides in combination with reducing carbon.

It is an additional object of this invention to provide a process adaptable for efficient reduction of metal oxides by employing metal oxide particles having carbon intimately associated therewith.

It is a further object of this invention to produce metal oxide particles suitable for use in carbothermal reductions and like processes in an efficient and relatively inexpensive manner.

These and other objects of this invention will appear hereinafter and for purposes of illustration, but not of limitation, specific embodiments of this invention are shown in the accompanying drawings, in which—

FIGURE 1 is a schematic illustration of the processing cycle employed in the practice of this invention; and FIGURES 2 and 3 are schematic illustrations of alternative processing cycles employed in the practice of this invention.

The process of this invention may be broadly described as a thermally self-governed process for the preparation of the aforementioned materials wherein hydrocarbons are put into contact with a heated mixture of metallic oxides and thermally decomposed or cracked according to well-known principles. In such a procedure, the oxides are intimately contacted by the carbon from the decomposed hydrocarbons. The hydrogen which results from the cracking is recovered and burned in the presence of more oxides which are to be introduced into the decomposition chamber. Since the hydrogen recovered from the decomposition includes substantial latent energy, and since the reaction with the oxygen for burning the gases is a highly exothermic one, sufficient calories are produced for heating the metallic oxides to decompose the hydrocarbons.

In the course of the following description it will be apparent that it is desired to heat the oxide particles for introduction into the decomposition chamber to temperatures above 900° C. and preferably between 1100–1400° C. The burning of the released hydrogen will yield sufficient calories to effect heating of the particles within these temperature ranges.

Thermal decomposition of the hydrocarbons employed in the practice of this invention will proceed according to the following equation:

(1) $\quad C_nH_{2n+2} \rightarrow nC + (n+1)H_2$ 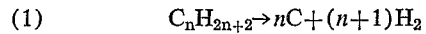

It is preferred that hydrocarbons containing 4 carbon atoms or less be employed, and methane is particularly advantageous in this respect. The metal oxides which are adapted to be impregnated with carbon in accordance with this invention include the oxides of aluminum, magnesium, berryllium, calcium, titanium and zirconium.

As previously noted, it is an essential feature of this invention that the hydrogen released from the decomposition chamber is burned to provide heat for the preparation of succeeding amounts of metal oxides. Such burning is carried out according to one of the following equations:

(2) $\quad (n+1)H_2 + \left(\dfrac{n+1}{2}\right)O_2 \rightarrow (n+1)H_2O$ 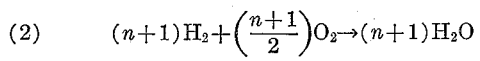

or (3)

$(n+1)H_2 + \left(\dfrac{n+1}{2}\right)O_2$ 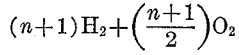
$\quad + 2(n+1)N_2 \rightarrow (n+1)H_2O + 2(n+1)N_2$ The calories liberated in the course of the above reactions are sufficient to induce the endothermal cracking reaction according to Equation 1 since the metal oxide particles are heated in the combustion zone to the decomposition temperatures of the hydrocarbons. The decomposition of the originally cold hydrocarbons in the presence of the heated but originally cold metal oxide particles results in impregnation of the metal oxide particles since they are thoroughly put into contact with, and coated with, reducing carbon. Apart from the original heat needed to initiate the processing, there is thus provided a thermally self-governed, continuous production of carbon-coated metal oxides without expenditure of energy.

There are amounts of water vapor formed in the combustion chamber, as noted in Equations 2 and 3, and it is therefore necessary that the combustion chamber be maintained apart from the cracking chamber in order to avoid carbon losses. Such losses would occur if the following reaction were permitted to take place:

(4) $\quad C + H_2O \rightleftharpoons CO + H_2$ 

The process of the present invention may be carried out by cracking hydrocarbons in contact with the metallic oxide particles, then burning the gases liberated in the course of that thermal decomposition reaction while the coated particles are recovered from a moving or fluid bed.

Such a process may be carried out as diagrammatically represented in FIGURE 1, wherein a moving bed comprising metallic oxide particles is succeedingly put into contact with two gaseous currents in a cracking zone 2. Previously heated metallic oxide particles are introduced at 5 and put into contact with a hydrocarbon current introduced at 8. The latter becomes heated and is cracked on contacting the metal oxide particles, thus permitting carbon to be deposited. This reaction liberates gases which are extracted at 9 and which consist substantially of hydrogen, according to Equation 1. In an initial zone of combustion 1, this hydrogen is introduced at 10, put into contact with an oxygen-containing gas injected at 11, and burned in contact with the metallic oxide particles which are introduced at 4. This combustion proceeds according to Equation 2 or 3, the calories liberated by the reactions preheating the oxide particles before they enter the cracking zone. According to such a technique, the power required for heating and cracking the hydrocarbons in contact with the metallic oxide particles is totally supplied by the latent heat stored in these particles and liberated in the course of combustion.

The thus treated particles are preferably added in the form of granules of a size less than 20 mm. and preferably between 2–10 mm. They should be sufficiently porous and have a large specific surface, and thus are preferably provided in the form of blown balls.

As a further feature of this invention, it is preferable to add to the charge of said metallic oxide particles a ballast which acts as a thermal wheel. In other words, the ballast will store, in the course of the combustion phase, part of the calories liberated by the exothermal reaction, and yield these calories during the thermal decomposition phase. The ballast employed is of a refractory nature, produced out of a material with a melting point of 2000° K. or higher, and will consist substantially of a metallic oxide base with compact grains. The ballast is preferably made out of the same substance as the particles treated, and may be in the form of sintered bodies of such particles. The ballast grains are provided in the form of balls of a size greater than that of the treated particles which may range from 15 mm. and preferably greater than 20 mm. The ballast is formed of a dense and non-porous material as opposed to the porous character of the oxide particles, and is thus not impregnated to any great extent in the cracking zone. The carbon formed by the thermal decomposition of the hydrocarbons will, at the most, be recovered as a thin layer on the ballast which will correspond to less than 10% of the total carbon thus obtained.

The quantity of ballast added according to this process depends on the specific heat and dissociation energy of the hydrocarbon employed, on the specific heat of the metallic oxide to be impregnated with carbon, and finally, on the amount of cracking carbon and the molar carbon-metal oxide ratio which it is desired to obtain. For example, in the case of cracking methane in the presence of aluminum oxide particles, and in order to obtain a carbon-to-aluminum oxide ratio of about 3, the quantity of said ballast by weight compared to that of the particles is preferably of the order of 2–3. As can be appreciated, variations in the specific heats of the hydrocarbons and metal oxides, and variations in the dissociation energy of the hydrocarbons will result in corresponding changes in ballast proportions since the heat-carrying capacity of the charge must be adjusted.

After treatment, the ballast is easily separated from the particles of metallic oxide which have been impregnated and coated with carbon by simple sieving or like operations, and is then recycled.

According to a further non-limiting embodiment of the present invention, the known techniques of the fluid bed or fluidization may be utilized. In this instance, the cracking zone where the hydrocarbon is in contact with the previously heated particles of metal oxide and the combustion zone where the cold particles of metallic oxide are in contact with the gases formed in the course of thermal decomposition, are constituted by two parallel operating cycles.

FIGURE 2 illustrates a flow sheet of this alternative arrangement relating to a fluid bed technique, and FIGURE 3 illustrates a flow sheet of the arrangement relating to a fluidization technique. In these figures, in which like numerals are employed to identify like parts, there is shown a cracking zone 32 into which previously heated metallic oxide particles are introduced at 35 and are maintained in the fluidized state by means of a gaseous current consisting substantially of a hydrocarbon. The hydrocarbon, which is injected at 38, may contain amounts of inert gases, such as hydrogen and water vapor. This hydrocarbon is cracked on contacting the heated metallic oxide, whereby carbon is deposited and gases consisting substantially of hydrogen are liberated according to Equation 1. Gases issuing from the cracking zone at 52 are filtered with respect to the solid particles they have drawn along in suspension by passing through the cyclone separator 53. The solid particles are then recycled at 54 and gases are tapped at 39. In an initial zone of combustion 31, these gases are introduced at 40 and hydrogen contained therein is combusted according to Equation 2 or 3. According to such a technique, the energy necessary for heating and cracking the hydrocarbons is provided, totally or in a major part, by the latent heat accumulated in these particles in the course of combustion. Gases issuing from the combustion zone at 55 are filtered with respect to solid particles by means of the cyclone-type separator 56, and solid particles are then recycled at 57 and gases tapped at 42.

Container 49 is positioned whereby gases exiting from the separator 56 may be passed therethrough. These gases may be passed through the hydrocarbon gases entering at 50 and passing from the container 49 through 38 to the cracking zone 32, thus preheating the gases and including inert gases and water vapor therein. Alternatively, these gases may be utilized solely to preheat the hydrocarbon gases by passing them through the container 49 out of contact with the hydrocarbon gases and out through the exit 51.

The following example, which in no way may be considered limiting, has for its aim to illustrate the various objects of the process according to this invention, particularly with regard to the apparatus employed therewith.

An apparatus suitable for use with the processes of this invention includes an upright tubular furnace into which a solid, more or less divided charge may be introduced from the top, flow down by gravity, and be extracted at the bottom. The thus created moving bed is adapted to be put into contact with, countercurrentwise, the gases which are passed through it. The furnace includes a chamber with a circular cross-section, the walls of which are made of a heavy refractory aluminum oxide capable of withstanding temperatures substantially above 1700° C. A lower zone within the refractory walls is provided for cracking methane or other hydrocarbons, and the temperature of this zone will be maintained between about 900–1400° C. during a continuous operation. An upper zone for combustion by air or other oxidizing gases of the hydrogen will be maintained at a temperature between about 1700–1900° C. An intermediate zone having a cross-section smaller than that of both of the upper and lower zones is provided for increasing the speed of the ascending gases and thus prevents the diffusion towards the lower zone of the air injected into the upper zone. A substantial heat-insulating packing surrounds the chamber, and a gas-tight metallic casing surrounds the insulation. Means for injecting gaseous hydrocarbons are disposed at the bottom of the furnace, and means for injecting oxygen-containing gases into the combustion zone, along with means for sucking of gases and means for the continuous charge of the furnace with solid materials, are associated with the upper part of the furnace. A water jacket may be provided to cool the solid materials which are being continuously extracted from the bottom of the furnace.

In operation, the furnace is fed with a charge consisting of a mixture of corundum, in a porous globular form, of about 3–5 mm. diameter, and compact balls of sintered corundum of about 15–30 mm. diameter. The feeding speed is such that flow rates are the following:

As globular corundum, about_____ 185 kg./day or 7.7 kg./hour.
As corundum balls, about_____ 600 kg./day or 25 kg./hour.

When starting the furnace, a mixture of methane and air is injected in the combustion zone in order to heat this charge and to bring it to a temperature higher than 900° C. and of the order of 1100–1200° C. to 1300–1400° C., which is required for cracking methane.

After the furnace has been started, a mixture of hydrocarbons, substantially consisting of methane, is injected at the bottom of the furnace, at a rate of about 5.5 m.³/hour, measured under normal temperature and pressure conditions. In the combustion zone, there is then injected about 40 m.³/hour air, also measured under normal temperature and pressure conditions.

The combustion, in the combustion zone, of the hydrogen liberated in the cracking zone, heats up the mass of corundum to about 1700° C., taking into account the excess of air introduced.

After sieving, there are regularly collected 250 kg. particles, consisting of an intimate mixture of carbon and aluminum oxide in a molar ratio of the order of 3 to 1. 600 kg. of heavy corundum are recycled in the fashion heretofore explained.

The products obtained according to the present process are, according to a special embodiment which also constitutes part of the present invention, compacted in the presence of a carbon base binder and heated to a temperature above 400° C. and preferably from 900–1200° C. or higher. This leaves behind a solid residue substantially consisting of carbon. The binder may comprise either one or several heavy hydrocarbons as a carbonaceous or petroleum origin such as, for example, coal pitch; or a more or less viscous, liquid aqueous mixture forming a gel and having a carbohydrate base, such as oses, holosides, heterosides, starch, cellulose, etc. In addition, proteins, such as gelatins, glues, etc. and mixtures thereof, may be employed for this purpose.

The amount of carbon brought in by said binder is calculated in such a way that, combined with the carbon produced during impregnation by cracking of hydrocarbons, it will correspond approximately to the mass of reducing carbon required for the reduction of the thus treated oxidized compound, in the course of a subsequent oxidation-reduction treatment.

The materials obtained according to the process which is the object of the present invention are utilized in any carbothermal reduction or other process such as, for example, and without this being a limiting enumeration, production of metals from their oxidized ores, preparation of metallic carbides, manufacture of metallic nitrides, halides, etc.

It will be understood that various modifications may be made in the above-disclosed process while providing the characteristics of this invention without departing from the spirit of the invention, particularly as defined in the following claims.

We claim:

1. A process for the manufacture of metal oxide-carbon composites in which the metal of the oxide is selected from the group consisting of aluminum, magnesium, beryllium, calcium, titanium and zirconium comprising the steps of introducing gaseous hydrocarbon compounds having from 1–4 carbon atoms into a decomposition chamber, passing the metal oxide particles heated to a temperature in excess of 900° C. into intimate contact with the hydrocarbon whereby the hydrocarbon disassociates into hydrogen which is released as a gas and carbon which is retained by the metal oxide as a solid separating the released hydrogen gas, mixing the separated hydrogen gas with an oxygen-containing gas and burning the mixture in the presence of said metal oxide particles prior to their contact with said hydrocarbon portion whereby said particles are preheated.

2. A process for the manufacture of metal oxide-carbon composites in which the metal of the oxide is selected from the group consisting of aluminum, magnesium, beryllium, calcium, titanium and zirconium comprising the steps of introducing gaseous hydrocarbon compounds having from 1–4 carbon atoms into a decomposition chamber, passing porous metal oxide granules having dimensions of up to 20 mm. heated to a temperature in excess of 900° C. into intimate contact with the hydrocarbon whereby the hydrocarbon decomposes into hydrogen which goes off as a gas and carbon which is retained by the metal oxide as a solid, separating the released hydrogen gas, mixing the separated hydrogen gas with an oxygen-containing gas and burning the mixture in the presence of said metal oxide porous granules prior to their contact with said carbon portion whereby said porous granules are preheated.

3. The process according to claim 2 wherein said dimensions are in the range of from 2–10 mm.

4. The process according to claim 2, including the step of adding ballast to said metal porous granules prior to said heating and impregnating steps, said ballast being comprised of dense refractory granules having their smallest dimensions in excess of 15 mm.

5. A process for the manufacture of metal oxide-carbon compositions in which the metal of the metal oxide is selected from the group consisting of aluminum, magnesium, beryllium, calcium, titanium and zirconium, comprising the steps of introducing gaseous hydrocarbon compounds having from 1–4 carbon atoms into a decomposition chamber, passing the metal oxide particles heated to a temperature in excess of 900° C. into contact with the hydrocarbons in the decomposition chamber whereby the hydrocarbons disassociate into hydrogen which goes off as a gas and carbon which is retained by the metal oxide as a solid, recovering said impregnated particles, compacting said recovered particles with a binder containing heavy hydrocarbons, and heating said compounds to a temperature in excess of 400° C. whereby additional carbon residue is associated with said particles.

6. The process according to claim 5, including the step of adding ballast to said metal particles prior to said heating and impregnating steps, said ballast being comprised of dense refractory granules having their smallest dimensions in excess of 15 mm.

7. In a process for the continuous production of metal oxide-carbon composites in which the metal of the oxide is selected from a group consisting of aluminum, magnesium, beryllium, calcium, titanium and zirconium while employing a chamber having in series a decomposition zone and a combustion zone, means for continuously introducing metal oxide particles into said combustion zone, and means for continuously introducing hydrocarbon gases having from 1–4 carbon atoms into said decomposition zone, the steps comprising heating said metal oxide particles during passage through said combustion zone to a temperature in excess of 900° C., continuously passing said heated particles of metal oxide into said decomposition zone into contact with the hydrocarbon whereby the hydrocarbon disassociates into hydrogen, which is released as a gas, and carbon, which is retained by the metal oxide as a solid, continuously separating the released hydrogen, mixing the hydrocarbon with an oxygen-containing gas, and continuously burning the mixture in said combustion zone in the presence of metal oxide to preheat the metal oxide passing through said zone.

8. The process according to claim 7, including the step of adding ballast to said metal oxide particles prior to said heating and impregnating steps, said ballast being comprised of dense refractory granules having their smallest dimensions in excess of 15 mm.

References Cited in the file of this patent

UNITED STATES PATENTS

| | | |
|---|---|---|
| 2,288,613 | Dill | July 7, 1942 |
| 2,296,522 | Hartley | Sept. 22, 1942 |